United States Patent [19]

Sartori et al.

[11] 4,405,586

[45] Sep. 20, 1983

[54] N-SECONDARY BUTYL GLYCINE PROMOTED ACID GAS SCRUBBING PROCESS

[75] Inventors: Guido Sartori, Linden; Warren A. Thaler, Aberdeen, both of N.J.

[73] Assignee: Exxon Research and Engineering Co., Florham Park, N.J.

[21] Appl. No.: 321,063

[22] Filed: Nov. 13, 1981

[51] Int. Cl.³ .................. B01D 53/34; C09K 3/00
[52] U.S. Cl. .................. 423/233; 423/228; 423/229; 423/232; 423/234; 252/189; 252/190; 252/192
[58] Field of Search .......... 423/223, 226, 228, 229, 423/232, 234; 252/189, 190, 192

[56] References Cited

U.S. PATENT DOCUMENTS

| | | | |
|---|---|---|---|
| 4,094,957 | 6/1978 | Sartori et al. | 423/232 X |
| 4,112,050 | 9/1978 | Sartori et al. | 423/232 X |
| 4,180,548 | 12/1979 | Say et al. | 423/232 X |
| 4,183,903 | 1/1980 | Melchior et al. | 423/232 X |

FOREIGN PATENT DOCUMENTS

| | | | |
|---|---|---|---|
| 767105 | 11/1971 | Belgium | 423/226 |
| 1305718 | 2/1973 | United Kingdom | 423/226 |

Primary Examiner—Earl C. Thomas
Attorney, Agent, or Firm—Albert P. Halluin; Janet Hasak

[57] ABSTRACT

The present invention relates to an alkaline salt promoter system which includes N-secondary butyl glycine and its use in acid gas scrubbing processes.

14 Claims, 1 Drawing Figure

VAPOR LIQUID EQUILIBRIUM ISOTHERMS FOR AMINE-PROMOTED $K_2CO_3$ ILLUSTRATING CALCULATION OF THE THERMODYNAMIC CYCLIC CAPACITY $CO_2$ LOADING IN SOLUTION MOLES $CO_2$/MOL INITIAL $K_2CO_3$

N-SECONDARY BUTYL GLYCINE PROMOTED ACID GAS SCRUBBING PROCESS

BACKGROUND OF THE INVENTION

1. Field of the Invention

The present invention relates to the use of N-secondary butyl glycine as a promoter for alkaline salts in "hot pot" type acid gas scrubbing processes.

2. Description of Related Patents

Recently, it was shown in U.S. Pat. No. 4,112,050 that sterically hindered amines are superior to diethanolamine (DEA) as promoters for alkaline salts in the "hot pot" acid gas scrubbing process. U.S. Pat. No. 4,094,957 describes an improvement to this process whereby amino acids, especially sterically hindered amino acids, serve to prevent phase separation of the aqueous solution containing sterically hindered amines at high temperatures and low fractional conversions during the acid gas scrubbing process.

One of the preferred sterically hindered amines described in these patents is N-cyclohexyl 1,3-propanediamine. The bulky cyclohexane ring on this diamino compound provides steric hindrance to the carbamate formed at this site thereby favoring the expulsion of $CO_2$ during regeneration, thereby leaving the hindered amine group free to protonate. The primary amino group of this diamino compound assists in maintaining solubility under lean conditions. Under lean conditions when there is insufficient carbonic acid present to protonate the hindered amino group, the molecule would be insoluble were it not for the primary amino group which forms a stable polar carbamate ion. However, even the carbamated primary amino group is insufficient to prevent insolubility of the compound under very lean conditions and an additional additive, as proposed in U.S. Pat. No. 4,094,957, an amino acid, is required to maintain solubility of the diamino compound. This amino acid also contributes to additional capacity and faster absorption rates for carbon dioxide, so it therefore acts as a copromoter in addition to solubilizing the sterically hindered diamino compound. Screening studies of available amino acids as possible copromoters for N-cyclohexyl 1,3-propanediamine based on cyclic capacity and rates of absorption ascertained that pipecolinic acid was one of the best amino acid copromoters.

Subsequent studies, however, have demonstrated that the N-cyclohexyl-1,3-propanediamine-pipecolinic acid promoter system has several shortcomings. Firstly, N-cyclohexyl-1,3-propanediamine is both chemically unstable and volatile. For example, it degrades into a cyclic urea in the presence of hydrogen sulfide. In fact, the rate of cyclic urea formation has been found to be highly dependent on hydrogen sulfide concentration, a common contaminant of industrial acid gas streams. The cyclic urea formation from this diamine is favored by the stability of the six-membered ring structure of the cyclic urea. In addition to promoter losses due to cyclic urea formation, which may be a serious problem with hydrogen sulfide rich streams, the cyclic urea product has limited solubility, and its separation from solution poses additional problems. Various techniques for coping with this water insoluble cyclic urea have been proposed. See, for example, U.S. Pat. Nos. 4,180,548 and 4,183,903. However, these techniques have specific benefits and problems, e.g., specialized equipment is necessary.

Pipecolinic acid also has shortcomings, e.g., it is rather expensive and its picoline precursor is in limited supply.

In view of the commercial potential of using the sterically hindered amino compounds as described and claimed in U.S. Pat. Nos. 4,094,957 and 4,112,050, there is a need for finding sterically hindered amino compounds which perform as well as N-cyclohexyl-1,3-propanediamine but do not have the volatility and degradation problems of this compound. Also, there is a need for finding a less costly replacement for pipecolinic acid which possesses its effectiveness. Preferably, there is a need for finding a single amino compound which performs as well or nearly as well as the N-cyclohexyl-1,3-propane-diamine/pipecolinic acid mixture, but not suffer the preparative cost volatility and degradation problems of this mixture. Such a discovery would be of significant technical and economic merit.

Various amino acids have been proposed as promoters for alkaline salts in the "hot pot" gas scrubbing process. For example, British Pat. No. 1,305,718 describes the use of beta and gamma amino acids as promoters for alkaline salts in the "hot pot" acid gas treating process. These amino acids, however, are not suitable because the beta-amino acids undergo deamination when heated in aqueous potassium carbonate solutions. The gamma amino acids form insoluble lactams under the same conditions. Also, the alpha-amino acid, N-cyclohexyl glycine, as described in Belgian Pat. No. 767,105, forms an insoluble diketopiperazine when heated in aqueous solutions containing potassium carbonate.

SUMMARY OF THE INVENTION

It has now been discovered that N-secondary butyl glycine, a sterically hindered monosubstituted alpha-amino acid, is an excellent promoter for alkaline salts in the "hot pot" acid gas scrubbing process. This amino acid, when used as the sole promoter, not only provides for high carbon dioxide capacity and high rates of carbon dioxide absorption, but does not form undesirable insoluble degradation products as in the case of N-cyclohexyl-1,3-propanediamine, the beta and gamma amino acids and the alpha amino acid, N-cyclohexyl glycine. Also, this amino acid is less volatile than N-cyclohexyl-1,3-propanediamine, thereby the economy of this promoter is greater than the previously employed promoters. In addition, this amino acid is superior in terms of carbon dioxide capacity and rates of absorption for carbon dioxide than pipecolinic acid and related amino acids. Furthermore, N-secondary butyl glycine can be prepared from relatively inexpensive compounds thereby reducing the cost compared to the use of pipecolinic acid.

Accordingly, in one embodiment of the present invention, there is provided a process for the removal of $CO_2$ from a gaseous stream containing $CO_2$ which comprises contacting said gaseous stream (1) in an absorption step with an aqueous absorbing solution comprising (a) a basic alkali metal salt or hydroxide separated from the group consisting of alkali metal bicarbonates, carbonates, hydroxides, borates, phosphates and their mixtures, and (b) an activator or promoter system for said basic alkali metal salt or hydroxide comprising at least an effective amount of N-secondary butyl glycine; and (2) in a desorption and regeneration step, desorbing at least a portion of the absorbed $CO_2$ from said absorbing solution.

As another embodiment of the present invention, there is provided an acid gas scrubbing composition comprising: (a) 10 to about 40% by weight of an alkali metal salt or hydroxide, (b) 2 to about 20% by weight of N-secondary butyl glycine, and (c) the balance, water.

In general, the aqueous scrubbing solution will comprise an alkaline material comprising a basic alkali metal salt or alkali metal hydroxide selected from Group IA of the Periodic Table of Elements. More preferably, the aqueous scrubbing solution comprises potassium or sodium borate, carbonate, hydroxide, phosphate or bicarbonate. Most preferably, the alkaline material is potassium carbonate.

The alkaline material comprising the basic alkali metal or salt or alkali metal hydroxide may be present in the scrubbing solution in the range from about 10% to about 40% by weight, preferably from 20% to about 35% by weight. The actual amount of alkaline material chosen will be such that the alkaline material and the amino acid activator or promoter system remain in solution throughout the entire cycle of absorption of $CO_2$ from the gas stream and desorption of $CO_2$ from the solution in the regeneration step. Likewise, the amount and mole ratio of the amino acids is maintained such that they remain in solution as a single phase throughout the absoption and regeneration steps. Typically, these criteria are met by including from about 2 to about 20% by weight of preferably from 5 to 15% by weight, more preferably, 5 to 10% by weight of this sterically hindered monosubstituted amino acid, N-secondary butyl glycine.

The aqueous scrubbing solution may include a variety of additives typically used in acid gas scrubbing processes, e.g., antifoaming agents, antioxidants, corrosion inhibitors and the like. The amount of these additives will typically be in the range that they are effective, i.e., an effective amount.

DESCRIPTION OF THE PREFERRED EMBODIENTS

Figure 1:
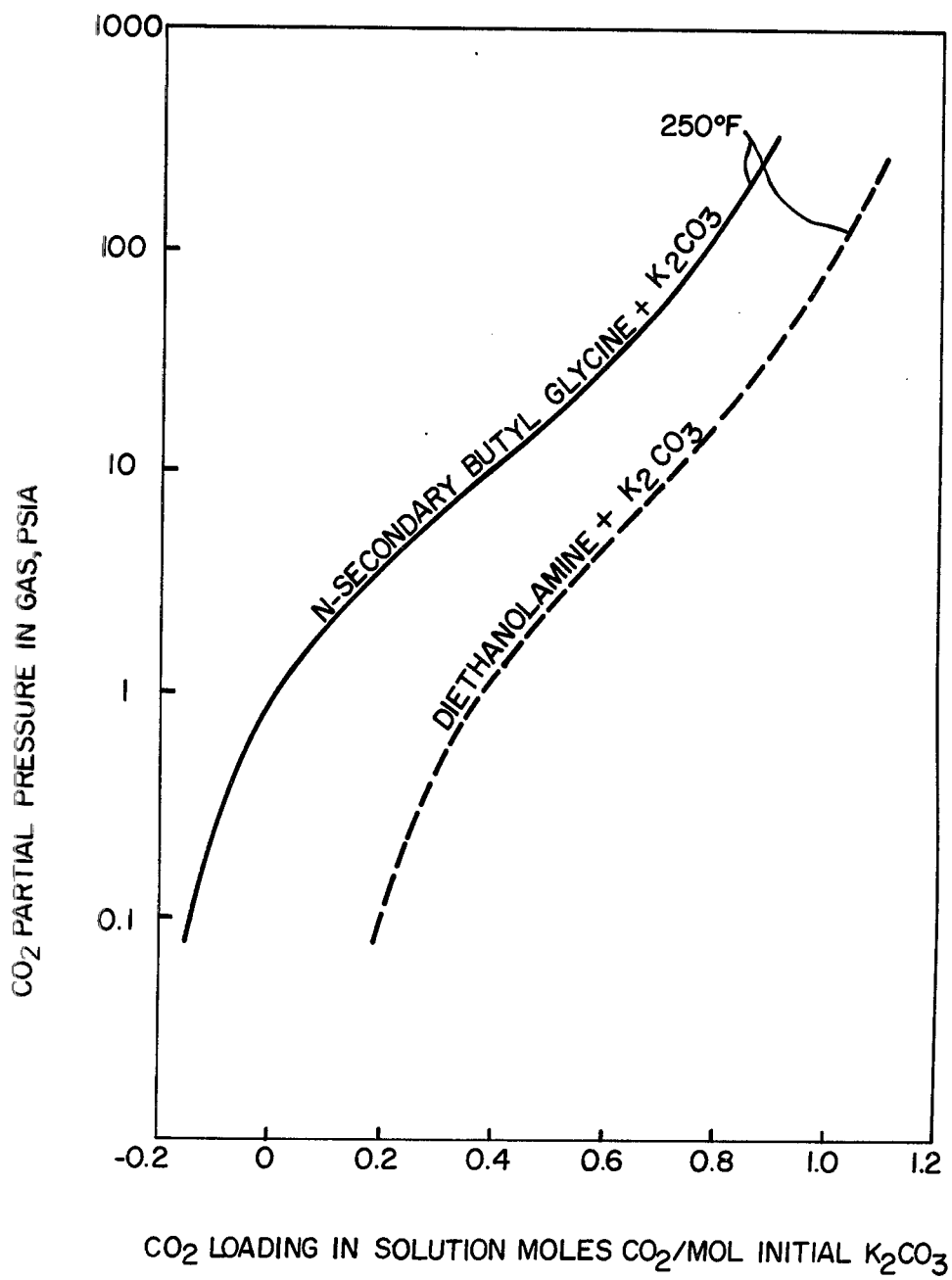
FIG. 1 graphically illustrates the vapor-liquid equilibrium isotherms for potassium carbonate solutions activated by equal nitrogen contents of N-secondary-butyl glycine and diethanola mine at 250° F. (121.1° C.) wherein the $CO_2$ partial pressure is a function of the carbonate conversion.

The term acid gas includes $CO_2$ alone or in combination with $H_2S$, $SO_2$, $SO_3$, $CS_2$, HCN, COS and the oxides and sulfur derivatives of $C_1$ to $C_4$ hydrocarbons. These acid gases may be present in trace amounts within a gaseous mixture or in major proportions.

The contacting of the absorbent mixture and the acid gas may take place in any suitable contacting tower. In such processes, the gaseous mixture from which the acid gases are to be removed may be brought into intimate contact with the absorbing solution using conventional means, such as a tower packed with, for example, ceramic rings or with bubble cap plates or sieve plates, or a bubble reactor.

In a preferred mode of practicing the invention, the absorption step is conducted by feeding the gaseous mixture into the base of the tower while fresh absorbing solution is fed into the top. The gaseous mixture freed largely from acid gases emerges from the top. Preferably, the temperature of the absorbing solution during the absorption step is in the range from about 25° to about 200° C., and more preferably from 35° to about 150° C. Pressures may vary widely; acceptable pressures are between 5 and 2000 psia, preferably 100 to 1500 psia, and most preferably 200 to 1000 psia in the absorber. In the desorber, the pressures will range from about 5 to 100 psig. The partial pressure of the acid gas, e.g., $CO_2$ in the feed mixture will preferably be in the range from about 0.1 to about 500 psia, and more preferably in the range from about 1 to about 400 psia. The contacting takes place under conditions such that the acid gas, e.g., $CO_2$, is absorbed by the solution. Generally, the countercurrent contacting to remove the acid gas will last for a period of from 0.1 to 60 minutes, preferably 1 to 5 minutes. During absorption, the solution is maintained in a single phase. N-secondary butyl glycine aids in reducing foam in the contacting vessels.

The aqueous absorption solution comprising the alkaline material, the activator system comprising the sterically hindered monosubstituted amino acid, N-secondary butyl glycine, which is saturated or partially saturated with gases, such as $CO_2$ and $H_2S$ may be regenerated so that it may be recycled back to the absorber. The regeneration should also take place in a single liquid phase. Therefore, the presence of the highly water soluble amino acid provides an advantage in this part of the overall acid gas scrubbing process. The regeneration or desorption is accomplished by conventional means, such as pressure reduction, which causes the acid gases to flash off or by passing the solution into a tower of similar construction to that used in the absorption step, at or near the top of the tower, and passing an inert gas such as air or nitrogen or preferably steam up the tower. The temperature of the solution during the regeneration step may be the same as used in the absorption step, i.e., 25° to about 200° C., and preferably 35° to about 150° C. The absorbing solution, after being cleansed of at least a portion of the acid bodies, may be recycled back to the absorbing tower. Makeup absorbent may be added as needed. The use of N-secondary butyl glycine enables one to maintain a single phase regardless of the $CO_2$ content in the acid gas.

As a typical example, during desorption, the acid gas, e.g., $CO_2$-rich solution from the high pressure absorber is sent first to a flash chamber where steam and some $CO_2$ are flashed from solution at low pressure. The amount of $CO_2$ flashed off will, in general, be about 35 to 40% of the net $CO_2$ recovered in the flash and stripper. This is increased somewhat, e.g., to 40 to 50%, with the high desorption rate promoter system owing to a closer approach to equilibrium in the flash. Solution from the flash drum is then steam stripped in the packed or plate tower, stripping steam having been generated in the reboiler in the base of the stripper. Pressure in the flash drum and stripper is usually 16 to about 100 psia, preferably 16 to about 30 psia, and the temperature is in the range from about 25° to about 200° C., preferably 35° to about 150° C., and more preferably 100° to about 140° C. Stripper and flash temperatures will, of course, depend on stripper pressure, thus at about 16 to 25 psia stripper pressures, the temperature will preferably be about 100° to about 140° C. during desorption. Single phase is maintained and facilitated by use of the N-secondary butyl glycine promoter.

In the most preferred embodiment of the present invention, the acid gas, e.g., $CO_2$ is removed from a gaseous stream by means of a process which comprises, in sequential steps, (1) contacting the gaseous stream with a solution comprising 10 to about 40 weight percent, preferably 20 to about 30 weight percent of potassium carbonate, an activator or promoter system comprising 2 to about 20 weight percent, preferably 5 to about 15 weight percent, more preferably 5 to about 10 weight percent of the sterically hindered monosubstituted amino acid, N-secondary butyl glycine, the balance of said solution being comprised of water, said contacting being conducted at conditions whereby the acid gas is absorbed in said solution, and preferably at a temperature ranging from 25° to about 200° C., more preferably from 35° to about 150° C. and a pressure ranging from 100 to about 1500 psig, and (2) regenerating said solution at conditions whereby said acid gas is desorbed from said solution. By practicing the present invention, one can operate the process above described at conditions whereby the working capacity, which is the difference in moles of acid gas absorbed in the solution at the termination of steps (1) and (2) based on the moles of potassium carbonate originally present, is greater than obtained under the same operating conditions for removing acid gases from gaseous streams, wherein said same operating conditions do not include N-secondary butyl glycine as the promoter. In other words, working capacity is defined as follows:

$$\begin{pmatrix} CO_2 \text{ in solution} \\ \text{at completion of} \\ \text{absorption} \end{pmatrix} \text{ less } \begin{pmatrix} CO_2 \text{ in solution} \\ \text{at completion of} \\ \text{desorption} \end{pmatrix}$$

Which is:

$$\frac{\text{Moles of } CO_2 \text{ Absorbed}}{\text{Initial Moles } K_2CO_3} \text{ less } \frac{\text{Moles Residual } CO_2 \text{ Absorbed}}{\text{Initial Moles } K_2CO_3}$$

It should be noted that throughout the specification wherein working capacity is referred to, the term may be defined as the difference between $CO_2$ loading in solution at absorption conditions (step 1) and the $CO_2$ loading in solution at regeneration conditions (step 2) each divided by the initial moles of potassium carbonate. The working capacity is equivalent to the thermodynamic cyclic capacity, that is the loading is measured at equilibrium conditions. This working capacity may be obtained from the vapor-liquid equilibrium isotherm, that is, from the relation between the $CO_2$ pressure in the gas and the acid gas, e.g., $CO_2$ loading in the solution at equilibrium at a given temperature. To calculate thermodynamic cyclic capacity, the following parameters must usually be specified: (1) acid gas, e.g., $CO_2$ absorption pressure, (2) acid gas, e.g., $CO_2$ regeneration pressure, (3) temperature of absorption, (4) temperature of regeneration, (5) solution composition, that is weight percent N-secondary butyl glycine and the weight percent of the alkaline salt or hydroxide, for example potassium carbonate, and (6) gas composition. The skilled artisan may conveniently demonstrate the improved process which results by use of the sterically hindered amino acid by a comparison directly with a process wherein the sterically hindered amino acid is not included in the aqueous scrubbing solutions. For example, it will be found when comparing two similar acid gas scrubbing processes (that is similar gas composition, similar scrubbing solution composition, similar pressure and temperature conditions) that when the sterically hindered amines are utilized the difference between the amount of acid gas, e.g., $CO_2$ absorbed at the end of step 1 (absorption step) defined above and step 2 (desorption step) defined above is significantly greater. This significantly increased working capacity is observed even though the scrubbing solution that is being compared comprises an equimolar amount of a prior art amine promoter, such as diethanolamine, 1,6-hexanediamine, etc. It has been found that the use of the N-secondary butyl glycine of the invention provides a working capacity which is at least 15% greater than the working capacity of a scrubbing solution which does not utilize the sterically hindered amino acid. Working capacity increases of from 20 to 60% may be obtained by use of the sterically hindered amino acid compared to diethanolamine.

Besides increasing working capacity and rates of absorption and desorption, the use of the N-secondary butyl glycine leads to lower steam consumption during desorption.

Steam requirements are the major part of the energy cost of operating an acid gas, e.g., $CO_2$ scrubbing unit. Substantial reduction in energy, i.e., operating costs will be obtained by the use of the process utilizing N-secondary butyl glycine. Additional savings from new plant investment reduction and debottlenecking of existing plants may also be obtained by the use of N-secondary butyl glycine. The removal of acid gases such as $CO_2$ from gas mixtures is of major industrial importance, particularly the systems which utilize potassium carbonate activated by the unique activator or promoter system of the present invention.

While the sterically hindered amines, as shown in U.S. Pat. No. 4,112,050, provide unique benefits in their ability to improve the working capacity in the acid scrubbing process, their efficiency decreases in alkaline "hot pot" (hot potassium carbonate) scrubbing systems at high temperatures and at low concentrations of the acid gas due to phase separation. Therefore, full advantage of these highly effective sterically hindered amines cannot always be utilized at these operating conditions. The addition of an amino acid, as a cosolvent and co-promoter as shown in U.S. Pat. No. 4,094,957, solves the problem of phase separation and enables a more complete utilization of sterically hindered amines as the alkaline materials activator or promoter. Many of the disclosed amino acids when used alone, such as pipecolinic acid, while soluble in these alkaline systems, are not as effective as activators in acid gas scrubbing processes as the other sterically hindered amines. Subsequent tests have confirmed that most amino acids are not as effective as N-cyclohexyl 1,3-propanediamine. Therefore, it was not expected that N-secondary butyl glycine, as the sole promoter, would provide high working capacity and high rates of $CO_2$ absorption.

The absorbing solution of the present invention, as described above, will be comprised of a major proportion of two alkaline materials, e.g., alkali metal salts or hydroxides and a minor proportion of the amino acid activator system. The remainder of the solution will be comprised of water and/or other commonly used additives, such as anti-foaming agents, antioxidants, corrosion inhibitors, etc. Examples of such additives include arsenious anhydride, selenious and tellurous acid, protides, vanadium oxides, e.g., $V_2O_3$, chromates, e.g., $K_2Cr_2O_7$, etc.

The N-secondary butyl glycine compound useful in the practice of the present invention is either available commercially or may be prepared by various known procedures. N-secondary butyl glycine has the CAS Registry Number of 58695-42-4 and is mentioned as an intermediate in several U.S. patents, e.g., U.S. Pat. Nos. 3,894,036; 3,933,843; 3,939,174 and 4,002,636, as well as the published literature (Kirino et al., Agric. Biol. Chem., 44(1), 31 (1980), but nothing is said in these disclosures about the synthesis of this amino acid or its use as a carbonate promoter in acid gas scrubbing processes.

A preferred method for preparing N-secondary butyl glycine comprises reacting glycine under reductive conditions with methyl ethyl ketone in the presence of a hydrogenation catalyst. This reaction produces the sterically hindered monosubstituted amino acid N-secondary butyl glycine in nearly quantitative yields. This process is more fully described and claimed in U.S. Ser. No. 321,058, filed concurrently herewith, entitled, "Amino Acids and Process for Preparing the Same" (G. Sartori and W. Thaler), the disclosure of which is incorporated herein by reference.

The invention is illustrated further by the following examples which, however, are not to be taken as limiting in any respect. All parts and percentages, unless expressly stated to be otherwise, are by weight.

EXAMPLE 1

"Hot Pot" Acid Gas Treating Process

The reaction apparatus consists of an absorber and a desorber as shown in FIG. 1 of U.S. Pat. No. 4,112,050, incorporated herein by reference. The absorber is a vessel having capacity of 2.5 liters and a diameter of 10 cm, equipped with a heating jacket and a stirrer. A pump removes liquid from the bottom of the reactor and feeds it back to above the liquid level through a stainless-steel sparger. Nitrogen and $CO_2$ can be fed to the bottom of the cell through a sparger.

The desorber is a 1-liter reactor, equipped with teflon blade stirrer, gas sparger, reflux condenser and thermometer.

The following reagents are charged into a 2-liter Erlenmeyer flask:

92 g of N-secondary butyl glycine
225 g of $K_2CO_3$
433 g of water

When all solid has dissolved, the mixture is put into the absorber and brought to 80° C. The apparatus is closed and evacuated until the liquid begins to boil. At this point, $CO_2$ is admitted into the absorber. Thirty-two (32) liters of $CO_2$ is absorbed.

The rich solution so obtained is transferred to the desorber and boiled for one hour, during which time 28 liters of $CO_2$ is desorbed. The regenerated solution so obtained is put into the absorber and cooled to 80° C. The apparatus is closed and evacuated until the liquid begins to boil. At this point $CO_2$ is admitted. 29.6 liters of $CO_2$ is absorbed, of which 13 liters is absorbed in the first minute.

EXAMPLE 2

The procedure of Example 1 is repeated after replacing N-secondary butyl glycine with an equimolar amount of other amino compounds, including structurally related sterically hindered amines and amino acids, and correcting the amount of water in order to have a total initial weight of 750 g. The results of these tests are shown in Table I.

TABLE I

CO₂ SCRUBBING BY AMINO ACID PROMOTED K₂CO₃ SOLUTIONS

| Amino acid | Liters of CO₂ Absorbed Into Regenerated Solution | |
|---|---|---|
| | Total | First Minute |
| N—sec. butyl glycine | 29.6 | 13 |
| N—cyclohexyl glycine | 30.8 | 14 |
| N—isopropyl glycine | 27.5 | 10 |
| N—(2-amyl)-glycine | 26.5 | 17 |
| N—sec. butyl alanine | 15 | 3 |
| N—isopropyl alanine | 25.2 | 4 |
| Pipecolinic Acid | 22.5 | 8 |

The data in Table I show that N-secondary butyl glycine and N-cyclohexyl glycine are superior promoters to the other tested sterically hindered amines and amino acids of similar structure.

In view of the data shown in Table I, additional tests were conducted with N-secondary butyl glycine and N-cyclohexyl glycine to ascertain their suitability in large scale acid gas scrubbing operations.

EXAMPLE 3

(a) Aging Studies in $CO_2$ Scrubbing Apparatus

The following experiments are carried out to ascertain the stability of N-secondary butyl glycine and N-cyclohexyl glycine under accelerated-simulated acid gas treating conditions.

The following reagents are charged into a stainless-steel bomb:

121 g of N-secondary butyl glycine
433 g of $KHCO_3$
540 g of $H_2O$

The bomb is put into an oven and heated at 120° C. for 1000 hours. Then the content is discharged into a 2 liter flask and refluxed for several hours.

750 g is taken and subjected to an absorption-desorption-reabsorption cycle as described in Example 1. 27.9 liters of $CO_2$ is absorbed into the regenerated solution, 10 liters being absorbed in the first minute.

Comparison of this result with that obtained with the fresh solution, described in Example 1, shows that the aging process does not lead to a significant loss of activity.

If the aging experiment is carried out after replacing N-secondary butyl glycine with the equivalent amount of N-cyclohexyl glycine, 145 g, and reducing the water to 516 g in order to have the same total weight, a considerable amount of solid, identified as 1,4-bis-cyclohexyl-2,5-diketopiperazine is formed. An attempt to carry out an absorption-desorption cycle causes plugging of the unit.

(b) Aging Under $CO_2$ and $H_2S$

The following reagents are charged into a stainless-steel bomb:

121 g of N-secondary butyl glycine
24 g of $K_2S$
390 g of $KHCO_3$
544 g of water The bomb is put into an oven and heated at 120° C. for 1000 hours. Then the content is discharged into a 2 liter flask and refluxed for several hours.

765 g is taken and subjected to an absorption-desorption-reabsorption cycle as described in Example 1. 28.9 liters of $CO_2$ is absorbed into the regenerated solution, 10 g being absorbed in the first minute. Comparison of this result with that obtained with the fresh solution, described in Example 1, shows that the aging process leads to only a slight loss of activity.

The excellent stability under the aging conditions shown above for the N-secondary butyl glycine coupled with its good performance as a promoter, demonstrates the desirability of using this amino acid rather than N-cyclohexylglycine.

EXAMPLE 4

Vapor-liquid equilibrium measurements were carried out to confirm that N-secondary butyl glycine leads to a broadening of cyclic capacity (as defined in U.S. Pat. No. 4,112,050, incorporated herein by reference) as compared to diethanolamine owing to a shift in the equilibrium position.

The vapor-liquid equilibrium measurements are made by first preparing the following solution:

| |
|---|
| 73.6 g of N—secondary butyl glycine |
| 150.0 g of $K_2CO_3$ |
| 376.4 g $H_2O$ |
| 600.0 g |

The solution is charged into a one-liter autoclave, equipped with stirrer, condenser, inlet and outlet tube for gases and liquid-sampling line. The autoclave is brought to 250° F. while blowing through the solution a mixture of 20 mol % $CO_2$ and 80 mol % He. The rate at which the gaseous mixture is fed is 0.2 liter/min.

The pressure is 300 psig. When the outgoing gas has the same composition as the entering gas, equilibrium has been reached. A sample of liquid is taken and analyzed. The $CO_2$ content is 13.0 wt. %, the K content is 13.6%, from which a carbonation ratio of 1.70 is calculated. By carbonation ratio, it is meant the molar ratio of $CO_2$ absorbed to initial $K_2CO_3$.

The operation is repeated several times, changing the composition of the gas and the total pressure. If the partial pressures of $CO_2$ are plotted against the carbonation ratios, the curve shown in FIG. 1 is obtained.

Using the same procedure, the vapor-liquid equilibrium curve is determined, using diethanolamine in an amount equivalent to the total amino acid amount used above. The resulting vapor-liquid equilibrium curve is also shown in FIG. 1.

In the interval of $P_{CO_2}$ studied, i.e., from 0.08 to 300 psia, N-secondary butyl glycine leads to a larger cyclic capacity than diethanolamine.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for the removal of $CO_2$ from a gaseous stream containing $CO_2$ which comprises contacting said gaseous stream (1) in an absorption step with an aqueous absorbing solution comprising (a) a basic alkali metal salt or hydroxide selected from the group consisting of alkali metal bicarbonates, carbonates, hydroxides, borates, phosphates, and their mixtures, and (b) an activator or promoter system for said basic alkali metal salt or hydroxide comprising N-secondary butyl glycine; and (2) in a desorption and regeneration step, desorbing at least a portion of the absorbed $CO_2$ from said absorbing solution.

2. The process of claim 1 wherein the basic alkali metal salt or hydroxide is potassium carbonate.

3. The process of claim 1 wherein the aqueous solution contains 10 to about 40% by weight of said basic alkali metal salt or hydroxide.

4. The process of claim 1 wherein the aqueous solution contains 2 to about 20% by weight of said N-secondary butyl glycine.

5. The process of claim 4 wherein the aqueous solution contains 5 to about 15% by weight of said N-secondary butyl glycine.

6. The process of claim 4 wherein the absorbing solution from the regenerating step is recycled for reuse in the absorption step.

7. The process of claim 1, 2, 3, 4, 5 or 6 wherein the temperature of the absorbing solution during the absoption step is in the range from about 25° to about 200° C., the pressure in the absorber ranges from about 5 to about 200 psia and the partial pressure of the acid gas components in the feed stream ranges from about 1.0 to about 500 psia, and wherein the temperature of the absorbing solution during the regeneration step ranges from about 25° to about 200° C., and at pressures ranging from about 16 to about 100 psia.

8. The process of claim 1, 2, 3, 4, 5, or 6 wherein the absorbing solution additionally includes additives selected from the group consisting of antifoaming agents, antioxidants and corrosion inhibitors.

9. A process for the removal of $CO_2$ from a gaseous stream containing $CO_2$ which comprises, in sequential steps, (1) contacting the gaseous stream with an absorbing solution comprising (a) from about 20 to about 30% by weight of potassium carbonate, and (b) an activator or promoter system for the potassium carbonate, comprising from about 5 to about 15% by weight of N-secondary butyl glycine as the sole promoter, (c) the balance of the solution comprising water and additives selected from the group consisting of antifoaming agents, antioxidants and corrosion inhibitors, wherein said contacting is conducted at conditions whereby $CO_2$ is absorbed in said absorbing solution and the temperature of the absorbing solution is in the range from about 35° to about 150° C., and the pressure in the absorber is in the range from about 100 to about 1500 psig; and (2) regenerating said absorbing solution at conditions whereby $CO_2$ is desorbed from said absorbing solution, wherein the regeneration takes place at temperatures ranging from about 35° to about 150° C. and at pressures ranging from about 5 to about 100 psig.

10. The process of claim 9 wherein the absorbing solution from the regeneration step is recycled for reuse in the absorption step.

11. An aqueous acid gas scrubbing composition comprising: (a) 10 to about 40% by weight of an alkali metal salt or hydroxide, (b) 2 to about 20% by weight of the sterically hindered monosubstituted amino acid, N-secondary butyl glycine and (c) the balance, water.

12. The composition of claim 11 wherein said alkali metal salt or hydroxide is potassium carbonate.

13. An aqueous acid gas scrubbing composition comprising: (a) 20 to 30% by weight of potassium carbonate, (b) 5 to about 15% by weight of N-secondary butyl glycine, and (c) the balance, water.

14. The composition of claims 11, 12 or 13 wherein the composition additionally includes antifoaming agents, antioxidants and corrosion inhibitors.

* * * * *